US012786713B2

(12) United States Patent
Kurita et al.

(10) Patent No.: US 12,786,713 B2
(45) Date of Patent: Nov. 3, 2026

(54) ACCESS CONTROL DEVICE AND ACCESS CONTROL METHOD

(71) Applicant: DENSO CORPORATION, Kariya-city (JP)

(72) Inventors: Yasuaki Kurita, Kariya-city (JP); Kei Okada, Kariya-city (JP); Satoshi Niwa, Kariya-city (JP); Yusuke Kani, Kariya-city (JP); Hideyuki Honya, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 30 days.

(21) Appl. No.: 19/081,904

(22) Filed: Mar. 17, 2025

(65) Prior Publication Data

US 2025/0220429 A1 Jul. 3, 2025

Related U.S. Application Data

(63) Continuation of application No. PCT/JP2023/033750, filed on Sep. 15, 2023.

(30) Foreign Application Priority Data

Sep. 29, 2022 (JP) ................................ 2022-156690

(51) Int. Cl.

*G06F 21/00* (2013.01)
*B60W 30/165* (2020.01)
*G06F 9/54* (2006.01)
*G08G 1/00* (2006.01)
*H04W 12/08* (2021.01)
*H04W 12/63* (2021.01)

(52) U.S. Cl.

CPC .......... *H04W 12/08* (2013.01); *B60W 30/165* (2013.01); *G06F 9/547* (2013.01); *G08G 1/22* (2013.01); *H04W 12/63* (2021.01); *B60W 2554/804* (2020.02)

(58) Field of Classification Search

CPC ....... H04W 12/08; H04W 12/63; H04W 4/44; B60W 30/165; B60W 2554/804; G06F 9/547; G08G 1/22; H04L 67/12; H04L 63/10

See application file for complete search history.

(56) References Cited

U.S. PATENT DOCUMENTS 11,538,287 B2 * 12/2022 Fang ...................... G07C 5/008
2014/0094987 A1 4/2014 Healey et al.
(Continued)

FOREIGN PATENT DOCUMENTS

JP 2013-232027 A 11/2013
JP 2015-529599 A 10/2015
JP 2018-181142 A 11/2018

*Primary Examiner* — Yogesh Paliwal
(74) *Attorney, Agent, or Firm* — Harness, Dickey & Pierce, P.L.C.

(57) ABSTRACT

An access control device or an access control method receives an access request from an application programming interface (API) use application provided outside a vehicle, controls access to a vehicle API, and assigns, to the API use application, an access privilege to a vehicle API that provides a function of a start confirmation unit, assigns an access privilege to the vehicle API necessary for providing a target service to the API use application.

12 Claims, 10 Drawing Sheets

(56) References Cited

U.S. PATENT DOCUMENTS

| | | | | |
|---|---|---|---|---|
| 2016/0241699 | A1* | 8/2016 | Milnark | H04M 1/724098 |
| 2018/0203984 | A1* | 7/2018 | Grigera | G06F 21/30 |
| 2018/0307247 | A1 | 10/2018 | Taniguchi | |
| 2020/0273268 | A1* | 8/2020 | Bhattacharyya | G06Q 10/06315 |
| 2020/0307598 | A1* | 10/2020 | Kumano | B60W 30/162 |
| 2021/0284156 | A1* | 9/2021 | Koike | B60W 40/08 |
| 2024/0181926 | A1* | 6/2024 | Magnusson | B60L 53/66 |

* cited by examiner

ACCESS CONTROL DEVICE AND ACCESS CONTROL METHOD

CROSS REFERENCE TO RELATED APPLICATIONS

The present application is a continuation application of International Patent Application No. PCT/JP2023/033750 filed on Sep. 15, 2023, which designated the U.S. and claims the benefit of priority from Japanese Patent Application No. 2022-156690 filed on Sep. 29, 2022. The entire disclosures of all of the above applications are incorporated herein by reference.

TECHNICAL FIELD

The present disclosure relates to a technology for providing services using vehicle functions.

BACKGROUND

In a comparative example, a system includes a driving assistance device and an in-vehicle terminal. In the system, multiple vehicles travel in a platoon manner according to a plan generated by the driving assistance device.

In a platooning system, an in-vehicle device repeatedly transmits vehicle position information, planned traveling route information, and the like to a center device. The center device generates information for the platooning based on the information collected from the multiple vehicles, and transmits the information to each vehicle in the platoon.

SUMMARY

An access control device or an access control method receives an access request from an application programming interface (API) use application provided outside a vehicle, controls access to a vehicle API, and assigns, to the API use application, an access privilege to a vehicle API that provides a function of a start confirmation unit, assigns an access privilege to the vehicle API necessary for providing a target service to the API use application.

DETAILED DESCRIPTION

Figure 1:
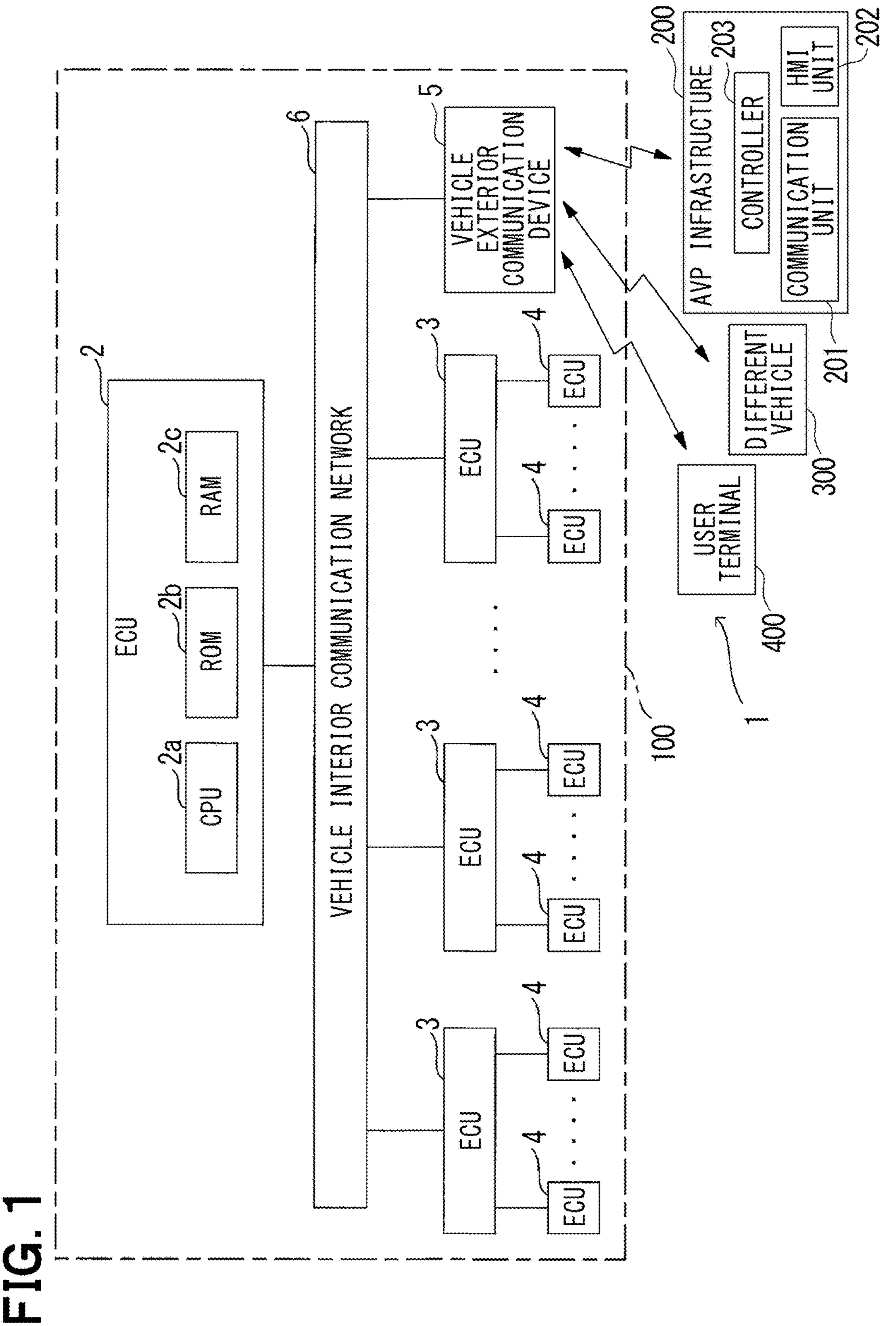
FIG. 1 is a block diagram showing a configuration of a mobility service provision system.

By the way, it is assumed that a vehicle configured to provide own information or function via API (hereinafter, vehicle API) performs platooning. In the assumed case, it is necessary to allow access to the vehicle API from external devices (for example, a center device or other vehicles). However, it is necessary to prevent leakage of personal information unrelated to the provision of services or unauthorized vehicle control unintended by the user due to such access to the vehicle API from the external device.

One example of the present disclosure provides a technology for appropriately restricting access to a vehicle API from outside a vehicle.

According to an example embodiment of the present disclosure, an access control device includes an access controller, an acceptance determination unit, and a start confirmation unit. The access restriction unit is configured to receive an access request from an API use application provided outside a vehicle and control access to a vehicle API. The vehicle API is an interface for providing a vehicle function of a vehicle. The API use application is an application that implements a service that uses the vehicle API. The acceptance determination unit is configured to provide, via the vehicle API, a function of determining whether the vehicle is possible to accept a target service that is the service by the API use application. The start confirmation unit is configured to provide, via the vehicle API, a function of confirming with a user of the vehicle whether to start provision of the target service.

The access controller includes a first assignment unit and a second assignment unit. The first assignment unit is configured to assign, to the API use application, an access privilege to the vehicle API that provides a function of the start confirmation unit, when the acceptance determination unit determines that the vehicle is possible to accept the target service. The second assignment unit is configured to assign, when the start confirmation unit confirms a start intention of a user, an access privilege to the vehicle API necessary for providing the target service to the API use application.

According to such a configuration, it is possible to appropriately restrict the access to the vehicle API from outside the vehicle.

According to another example embodiment of the present disclosure, the access control method controls access to a vehicle API by receiving an access request from a service provider that provides an API use service provided outside a vehicle. The vehicle API is an interface for providing a vehicle function of the vehicle. The API use application is an application that implements a service that uses the vehicle API.

The acceptance determination unit is configured to provide, via the vehicle API, a function of determining whether the vehicle is possible to accept a target service that is the service by the API use application. When the acceptance determination unit determines that the service is acceptable, the service provider is assigned an access privilege to a vehicle API that provides the function of the start confirmation unit. The start confirmation unit is configured to provide, via the vehicle API, a function of confirming with a user of the vehicle whether to start provision of the target service. When the start confirmation unit confirms a start intention of a user, the access privilege to the vehicle API necessary for providing the target service is assigned to the API use application.

According to such a configuration, it is possible to appropriately restrict the access to the vehicle API from outside the vehicle.

Hereinafter, an embodiment of the present disclosure will be described with reference to the drawings.

1. Configuration

As shown in FIG. 1, a mobility service provision system 1 of the present embodiment includes an in-vehicle system 100 mounted on a vehicle, an automated valet parking (hereinafter, AVP) infrastructure 200, a different vehicle 300, and a user terminal 400.

A vehicle equipped with the in-vehicle system 100 may have an automated driving function in addition to a manual driving function. The vehicle may be a hybrid vehicle having an engine and an electric motor as a traveling source. The vehicle is not limited to the vehicle having the automated driving function or the hybrid vehicle, but may be a vehicle having only a manual driving function, or a vehicle having only an engine or only an electric motor as the travel driving source. Hereinafter, the vehicle equipped with the in-vehicle system 100 will be simply referred to as a vehicle.

The in-vehicle system 100 includes one ECU 2, multiple ECUs 3, multiple ECUs 4, a vehicle exterior communication device 5, and a vehicle interior communication network 6. The ECU is an abbreviation for Electronic Control Unit.

The ECU 2 controls the multiple ECUs 3 to achieve coordinated control of the entire vehicle. The ECU 2 is connected to the vehicle interior communication network 6 to which multiple ECUs 3 are connected, and relays data frames communicated from each ECU 3 and the vehicle exterior communication device 5.

The ECU 3 is provided for each domain divided by function in the vehicle, and mainly controls multiple ECUs 4 existing within that domain. Each ECU 3 is connected to the ECU 4 under the control thereof via an individually provided lower layer network (for example, CAN). The CAN is an abbreviation for Controller Area Network and a registered trademark. The ECU 3 has a function of centrally managing access privilege of the ECU 4 under the control thereof and authenticating users. The domain includes, for example, a powertrain, a body, a chassis, a cockpit, and the like.

The ECUs 4 connected to the ECU 3 belonging to the powertrain domain include, for example, an ECU 4 that controls the engine, an ECU 4 that controls the motor, and an ECU 4 that controls the battery.

The ECUs 4 connected to the ECU 3 belonging to the body domain include, for example, an ECU 4 that controls the air conditioner and an ECU 4 that controls the doors.

The ECUs 4 connected to the ECU 3 belonging to a chassis domain include, for example, an ECU that controls the brakes and an ECU that controls the steering.

The ECUs 4 connected to the ECU 3 belonging to the cockpit domain include, for example, an ECU 4 that controls the display of meters and navigation, and an ECU 4 that controls in-vehicle HMIs operated by a vehicle user (hereinafter, user). The HMI is an abbreviation for Human Machine Interface.

The vehicle exterior communication device 5 performs peer-to-peer data communication within a small range (for example, within a few tens of meters) with an external device (i.e., the AVP infrastructure 200 or the different vehicle 300) that provides the API use service. The API use service will be described later. In addition, the vehicle exterior communication device 5 performs data communication with the user terminal 400 carried by a user via a wide area wireless communication network.

The vehicle interior communication network 6 includes, for example, CAN FD and Ethernet. The Ethernet is a registered trademark. The CAN FD is an abbreviation for CAN with Flexible Data Rate. The CAN FD connects the ECU 2 to each ECU 3 and the vehicle exterior communication device 5 via a bus. The Ethernet connects ECU 2 and each ECU 3 and the vehicle exterior communication device 5 individually.

The ECU 2 is an electronic control unit mainly including a microcomputer including a CPU 2*a*, a ROM 2*b*, a RAM 2*c*, and the like. Various functions of the microcomputer are implemented by the CPU 2*a* executing programs stored in a non-transitory tangible storage medium. In this example, the ROM 2*b* corresponds to a non-transitory tangible storage medium that stores a program. Further, by executing this program, a method corresponding to the program is executed. Note that partial or all of the functions executed by the CPU 2*a* may be implemented by a hardware circuit, such as one or more ICs. Further, the number of the microcomputers constituting the ECU 2 may be one or more.

The ECU 3, the ECU 4, and the vehicle exterior communication device 5 are all electronic control units mainly including a microcomputer provided with a CPU, ROM, RAM, and the like, similarly to the ECU 2. Further, the number of the microcomputers constituting the ECU 3 and ECU 4, and the vehicle exterior communication device 5 may be one or more.

Hereinafter, unless otherwise specified, the ECU 2, ECU 3, ECU 4, and the vehicle exterior communication device 5 will be collectively referred to as in-vehicle devices 2 to 5.

The AVP infrastructure 200 is infrastructure installed in a parking lot that provides the AVP service. The AVP service is a service in which a vehicle automatically travels in a large unmanned parking lot and automatically parks in an available parking space.

The AVP infrastructure 200 includes a communication unit 201, an HMI unit 202, and a controller 203.

The communication unit 201 performs peer-to-peer data communication with the in-vehicle system 100 within a small range.

The HMI unit 202 is used to input information and instructions required for providing the AVP service. The HMI unit 202 may receive information and instructions via the user terminal 400.

The controller 203 mainly includes a microcomputer including a CPU, a ROM, a RAM, and the like. The controller 203 has a service application (hereinafter, a service app) that implements the AVP service installed therein. The service app that implements the AVP service accesses the vehicle API of the in-vehicle system 100 via the communication unit 201 to exchange information necessary to start the AVP service and to perform vehicle control such as steering and acceleration/deceleration of the vehicle equipped with the in-vehicle system 100. This vehicle control implements vehicles to enter and leave by the automated driving. The API is an abbreviation for Application Programming Interface.

The vehicle API is a standardized interface used to access functions provided by a vehicle, and is not dependent on a specific vehicle model or grade. In other words, the vehicle API is configured so that even engineers who are not familiar with the characteristics and constraints of a vehicle can easily develop a service app that uses the vehicle API.

The different vehicle 300 is equipped with an in-vehicle system similar to the in-vehicle system 100 described above. A service application that implements the platooning service is installed in the in-vehicle system of the different vehicle 300. Of the vehicles using the platooning services, a service app installed in the vehicle that is the leading vehicle in the platoon accesses a vehicle API possessed by the in-vehicle system 100 of the following vehicle in the platoon. By accessing this vehicle API, the service app of the leading vehicle transmits and receives information necessary to start the platooning service, and performs vehicle control such as steering and acceleration/deceleration of the following vehicles so as to maintain the platoon. This vehicle control implements automated driving in the platooning.

The user terminal 400 is, for example, a portable terminal such as a smartphone or a tablet.

2. Functional Configuration

Next, the functional configuration of the in-vehicle system 100 will be described.

Figure 2:
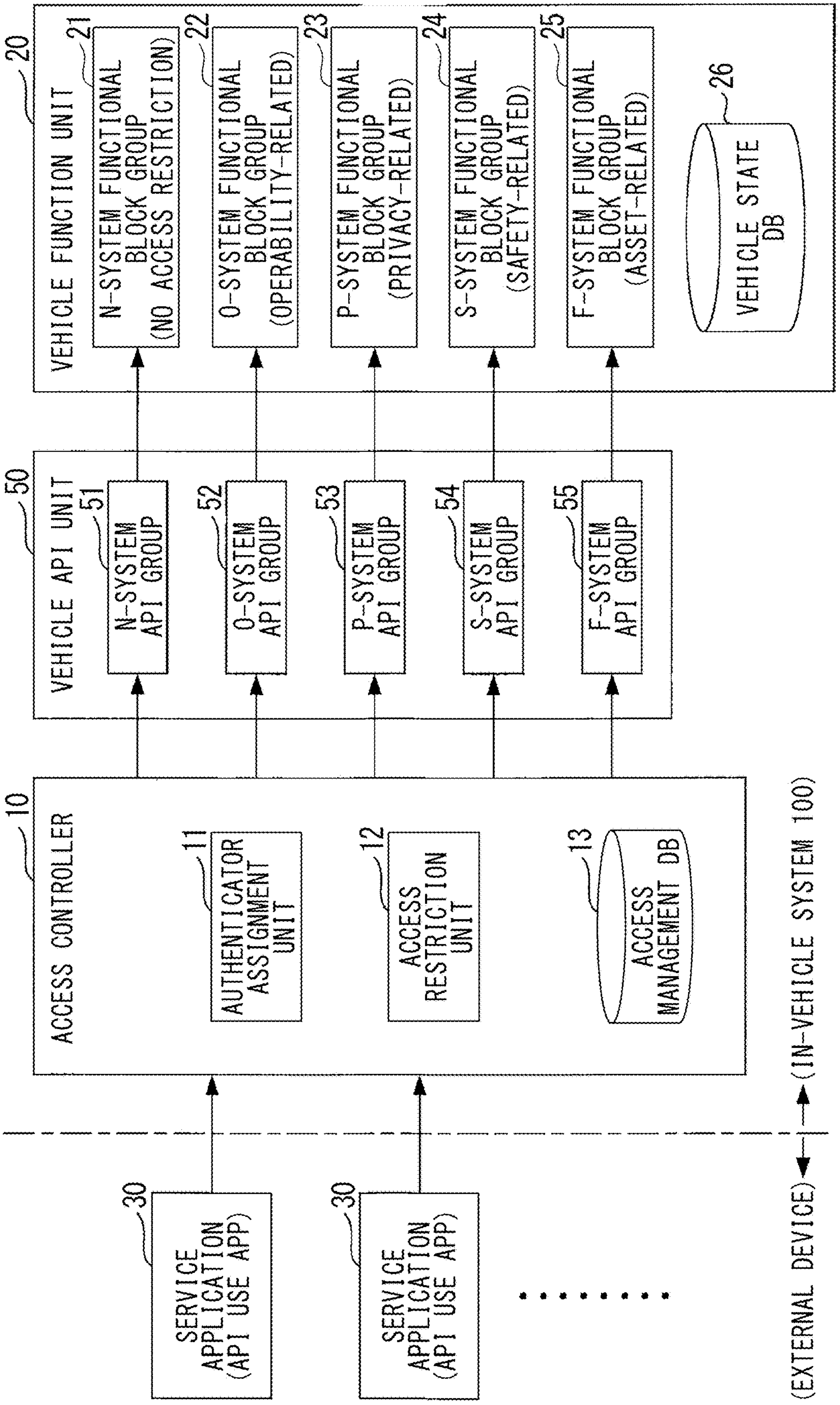
FIG. 2 is a block diagram showing a functional configuration of an in-vehicle system.

As shown in FIG. 2, the in-vehicle system 100 includes an access controller 10, a vehicle function unit 20, and a vehicle API unit 50. The access controller 10 and the vehicle function unit 20 may be placed in any of the in-vehicle devices 2 to 5. For example, the access controller 10, the vehicle function unit 20 and the vehicle API unit 50 are placed in the ECU 2.

2-1. Vehicle Function Unit

The vehicle function unit 20 is a collection of modules into which the functions of the vehicle are subdivided. Each module belonging to the vehicle function unit 20 is mounted in one of the in-vehicle devices 2 to 5.

The modules belonging to the vehicle function unit 20 are divided into multiple classifications, and different access restrictions are set for each category. The vehicle API for which access restrictions are set accepts an API access request and executes processes only when an authenticator associated with the category to which the vehicle API belongs is assigned to the API access request.

The vehicle function unit 20 has four classifications corresponding to four attributes F, S, O, and P defined as security protection assets, and one classification with no access restriction. The F is an abbreviation for Financial, S is an abbreviation for Safety, O is an abbreviation for Operational, and P is an abbreviation for Privacy.

The vehicle function unit 20 includes an N-system functional block group 21, an O-system functional block group 22, a P-system functional block group 23, an S-system functional block group 24, and a F-system functional block group 25 corresponding to each classification. Furthermore, the vehicle function unit 20 includes a vehicle state database (hereinafter, referred to as vehicle state DB) 26.

The N-system functional block group 21 is a collection of modules that provide functions that do not require access to vehicle functions or vehicle information. The O-system functional block group 22 is a collection of modules that provide functions related to the operational performance of the vehicle. The P-system functional block group 23 is a collection of modules that provide functions related to the user privacy information stored in the vehicle. The S-system functional block group 24 is a collection of modules that provide functions related to safety. The F-system functional block group 25 is a set of modules that provide functions related to the assets of a company or an individual.

The vehicle state DB 26 stores vehicle state data indicating the state of the vehicle. The vehicle state data stored in the vehicle state DB 26 is updated successively. The vehicle state data includes at least the vehicle position and travel speed. The vehicle state data may include the vehicle operation state, the operation state of in-vehicle devices, and detection results from various monitoring sensors that monitor the periphery and interior of the vehicle.

The vehicle API unit 50 is a collection of vehicle APIs prepared for accessing functions provided by the vehicle, that is, modules belonging to the vehicle function unit 20. The vehicle API unit 50 includes an N-system API group 51, an O-system API group 52, a P-system API group 53, a S-system API group 54, and a F-system API group 55.

The N-system API group 51 is a collection of vehicle APIs (hereinafter, N-system APIs) used to access each module belonging to the N-system functional block group 21. The N-system API has no access restrictions and accepts access requests even when the authenticator is not assigned to the access request.

Figure 5:
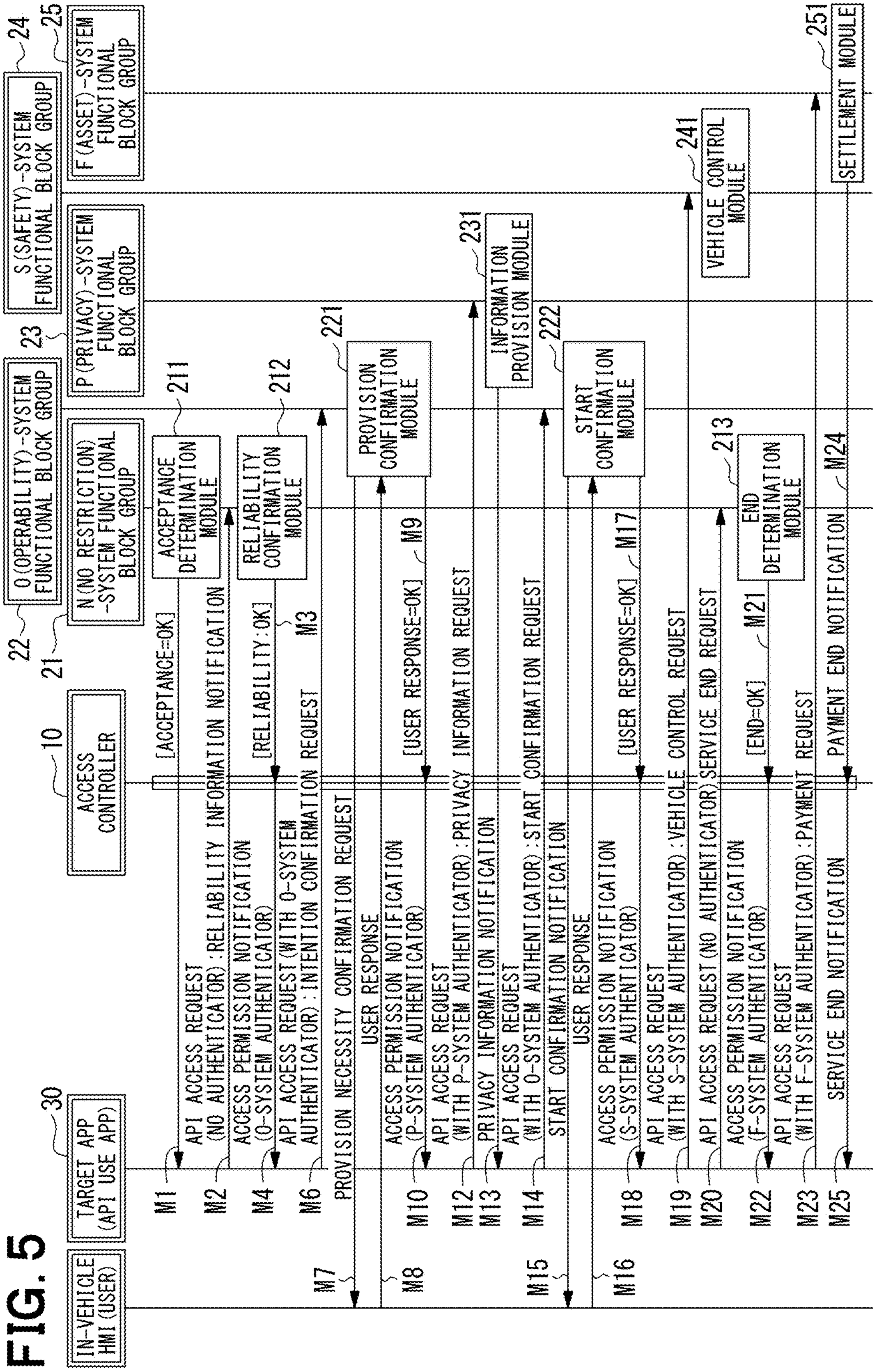
FIG. 5 is a sequence diagram showing a typical operation example of the in-vehicle system.
Figure 10:
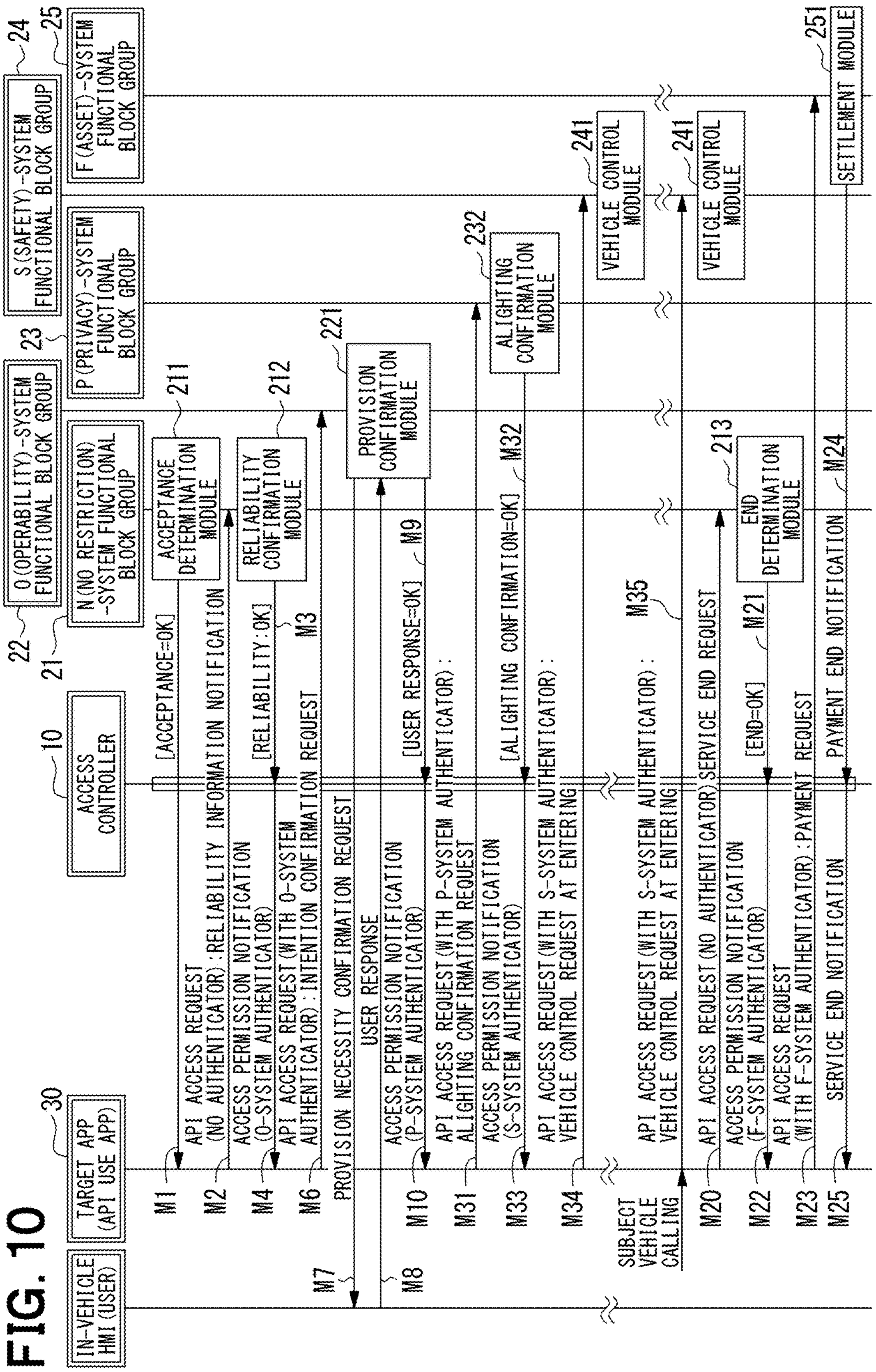
FIG. 10 is a sequence diagram showing an example of the operation of the AVP service.

As shown in FIGS. 5 and 10, the N-system functional block group 21 may include, for example, an acceptance determination module 211, a reliability confirmation module 212, an end determination module 213, and the like. The acceptance determination module 211 provides a function of determining whether the subject vehicle can accept a service provided by the API use application, and notifying the provider of the API use application of the result. The reliability confirmation module 212 provides a function of determining the reliability of a service provider based on reliability information provided by an API use application, and notifying the access controller 10 of the determination result. The end determination module 213 provides a function of determining whether a condition for ending a target service is satisfied, and when satisfied, notifying the access controller 10 of the satisfied state. The O-system API group 52 is a set of vehicle APIs (hereinafter, O-system APIs) used to access each module belonging to the O-system functional block group 22. The O-system API accepts an access request when an O-system authenticator is assigned to the access request.

The O-system functional block group 22 may include, for example, a provision confirmation module 221, a start confirmation module 222, and the like. The provision confirmation module 221 provides a function of confirming whether a user intends to receive the provision of a service by utilizing the in-vehicle HMI of the subject vehicle. The start confirmation module 222 provides a function of confirming whether the provision of a service may start by using the in-vehicle HMI of the subject vehicle.

The P-system API group 53 is a set of vehicle APIs (hereinafter, P-system APIs) used to access each module belonging to the P-system functional block group 23. The P-system API accepts an access request when a P-system authenticator is assigned to the access request.

The P-system functional block group 23 may include, for example, an information provision module 231, an alighting confirmation module 232, and the like. The information provision module 231 provides a function for reading out privacy information stored in the subject vehicle. The privacy information may include route information to a destination set by the user, parking lot reservation information, and the like. The alighting confirmation module 232 provides a function for accessing privacy information (for example, images taken inside the vehicle interior) stored in the subject vehicle and providing notification of information obtained from the images (for example, whether occupants exist).

The S-system API group 54 is a vehicle API (hereinafter, S-system API) used to access each module belonging to the S-system functional block group 24. The S-system API accepts an access request when an S-system authenticator is assigned to the access request.

The S-system functional block group 24 may include, for example, a vehicle control module 241 and the like. The vehicle control module 241 provides functions for performing vehicle control that changes the behavior of the vehicle, such as steering, acceleration, and deceleration, and includes different modules for each type of vehicle control.

The F-system API group 55 is a collection of vehicle APIs (hereinafter, F-system APIs) used to access each module belonging to the F-system functional block group 25. The F-system API accepts an access request when a F-system authenticator is assigned to the access request.

The F-system functional block group 25 may include, for example, a settlement module 251 and the like. The settlement module 251 provides a function for settling fees for the provided services.

2-2. API Use Application

A service application 30 that implements a desired function by utilizing the vehicle API is called an API use application. The API use application accesses the vehicle API to provide services using vehicle information and vehicle functions.

The API use application may be installed in the in-vehicle system 100, but here, a case will be described in which the application is installed in an external device such as the AVP infrastructure 200 or the different vehicle 300.

The API use application may be provided by the OEM or a third party.

The OEM is the vehicle manufacturer that produced the vehicle. The OEM is an abbreviation for original equipment manufacturer. Further, the OEM applications may include applications developed by the OEM itself and apps developed by other vendors.

The third party is any party other than a vehicle owner and an OEM.

Services provided by API use apps include, for example, a platooning service that implements platooning through automated driving, and an AVP service that implements AVP through automated driving. In the case of a platooning service, the different vehicle 300 traveling at the front in the platoon corresponds to the external device in the present disclosure. In the case of the AVP service, the AVP infrastructure 200 installed in the parking lot corresponds to the external device in the present disclosure.

When an API use application uses a function provided by the vehicle function unit 20, the application transmits the API access request, which is an access request to the vehicle API belonging to the vehicle API unit 50. The API access request includes at least information for identifying a service app (hereinafter, referred to as a use source app) that is a source of use and information for identifying a vehicle API (hereinafter, referred to as a use destination API) that is a destination of use. The API access request may be accompanied by an authenticator indicating that the request has access to a particular API.

The API access request is transferred to the vehicle API unit 50 via the access controller 10, and is further transferred from the vehicle API unit 50 to the vehicle function unit 20.

2-3. Access Controller

The access controller 10 has a function of controlling access to the vehicle API provided by each module belonging to the vehicle function unit 20.

The access controller 10 includes an authenticator assignment unit 11, an access restriction unit 12, and an access management database (hereinafter, referred to as an access management DB) 13.

The authenticator assignment unit 11 executes a process of assigning the authenticator prepared for each classification to the API use application. In the following, the API use application that uses the vehicle API of the subject vehicle is referred to as the target application 30. There may be multiple target applications 30. Moreover, the service provided by the target application 30 is called a target service.

Figure 3:
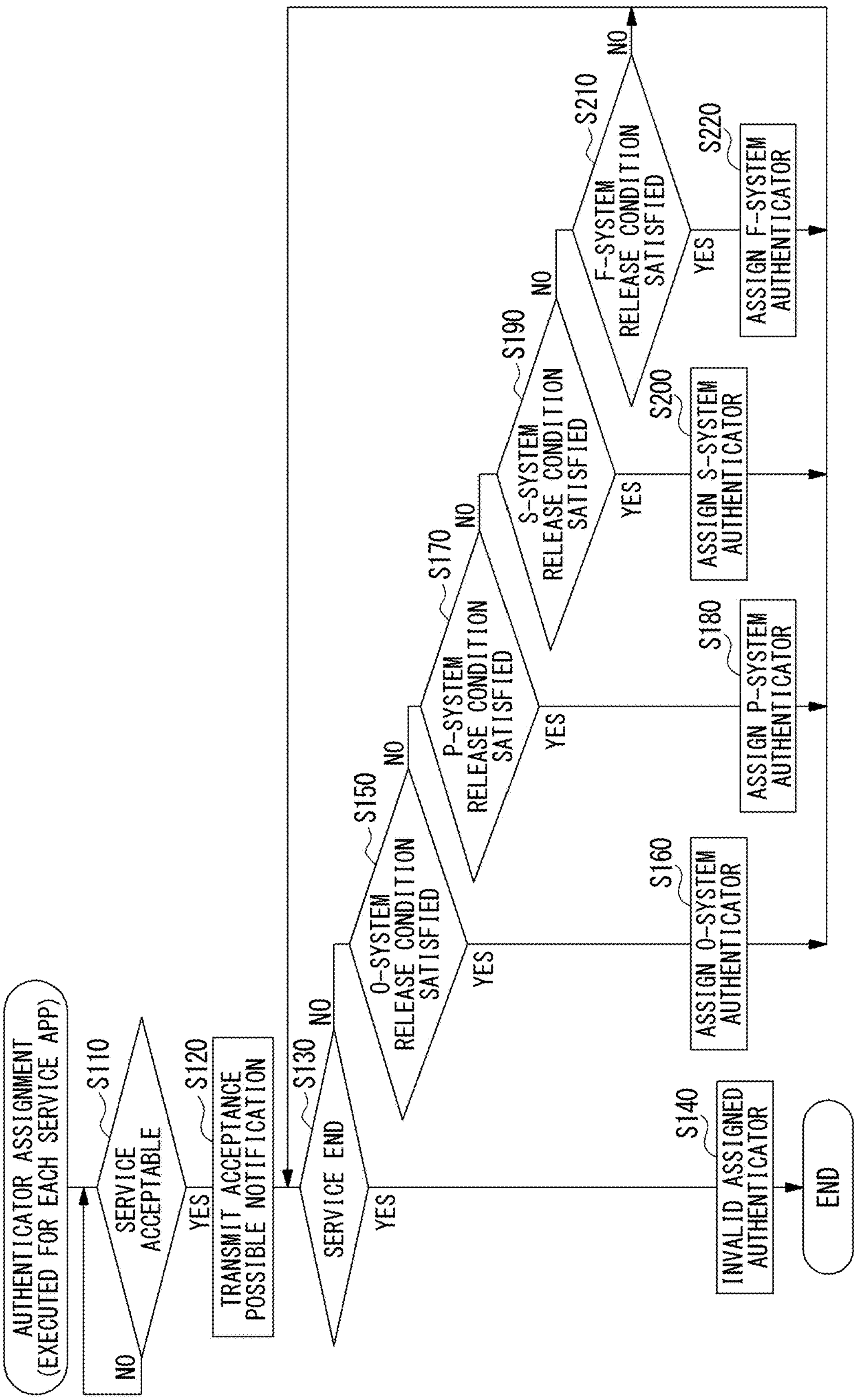
FIG. 3 is a flowchart showing processing contents in an authenticator assignment unit.

The authenticator assignment process executed by the authenticator assignment unit 11 will be described with reference to the flowchart shown in FIG. 3. The authenticator assignment process is executed individually for each API use application.

When the authenticator assignment process starts, the authenticator assignment unit 11 determines in S110 whether the subject vehicle can receive the target service. This determination is made using the acceptance determination module 211 belonging to the N-system functional block group 21. The acceptance determination module 211 is installed in advance in the in-vehicle system 100 of the subject vehicle when the target service is to be used, for example. When the subject vehicle can accept the target service, the acceptance determination module 211 notifies the authenticator assignment unit 11 of the state.

The acceptance determination module 211 receives reliability information from an external device that is the provider of the target service, and determines, based on the provided reliability information, whether the service is provided by the service provider intended by the driver.

When the target service is platooning, the leading vehicle in the platooning becomes the service provider, and the position, traveling speed, and the like of the leading vehicle are used as reliability information. Furthermore, when the target service is automated parking, the infrastructure that provides the automated parking service becomes the service provider, and the position and name of the infrastructure are used as the reliability information. Then, the acceptance determination module 211 compares the reliability information provided by the service provider with the subject vehicle position, traveling speed, map information, and the like stored in the vehicle state DB 26 to determine whether the subject vehicle exists at a position where it can receive the service. The position where the service can be provided may be, for example, a position where the driver of the subject vehicle can see the vehicle or infrastructure providing the service.

When the authenticator assignment unit 11 receives the notification from the acceptance determination module 211, it determines that the service is acceptable, and moves the process to S120. Moreover, when the authenticator assignment unit 11 does not receive a notification from the acceptance determination module 211, it determines that the service is not acceptable, and waits by repeating the same process.

In S120, the authenticator assignment unit 11 transmits an acceptance possible notification to the target application 30 implemented in the external device.

In the next S130, the authenticator assignment unit 11 determines whether the target service has ended. This determination may be made such that the service is completed when a payment completion notification indicating that the settlement process has been completed is received from the settlement module 251. Furthermore, when the settlement process is omitted, the authenticator assignment unit 11 may make the determination using the end determination module 213 belonging to the N-system functional block group 21. The end determination module 213, like the acceptance determination module 211, is installed in advance in the in-vehicle system 100 of the subject vehicle when the target service is to be used. When the end condition for ending the service is satisfied, the end determination module 213 notifies the authenticator assignment unit 11 of this state. The end determination module 213 may determine whether the end condition is satisfied based on the vehicle state data stored in the vehicle state DB 26, for example. When the authenticator assignment unit 11 receives a notification from the end determination module 213, it may determine that the service has ended.

When the authenticator assignment unit 11 determines that the service has ended, the process shifts to S140. When the authenticator assignment unit 11 determines that the service has not ended, the process shifts to S150.

In S140, the authenticator assignment unit 11 invalidates the authenticators assigned to the target application 30 in S160, S180, S200, and S220 described later, and ends the process.

In S150, the authenticator assignment unit 11 determines whether the O-system release condition that permits access to the O-system API is satisfied, and when the O-system release condition is satisfied, the process shifts to S160, and when the O-system release condition is not satisfied, the process shifts to S170.

In S160, the authenticator assignment unit 11 assigns the O-system authenticator to the target application 30 implemented in the external device, and the process returns to S130.

In S170, the authenticator assignment unit 11 determines whether the P-system release condition for permitting access to the P-system API is satisfied. When the P-system release condition is satisfied, the process shifts to S180, and when the P-system release condition is not satisfied, the process shifts to S190.

In S180, the authenticator assignment unit 11 assigns the P-system authenticator to the target application 30 implemented in the external device, and the process returns to S130.

In S190, the authenticator assignment unit 11 determines whether the S-system release condition that permits access to the S-system API is satisfied. When the S-system release condition is satisfied, the process shifts to S200. When the S-system release condition is not satisfied, the process shifts to S210.

In S200, the authenticator assignment unit 11 assigns the S-system authenticator to the target application 30 implemented in the external device, and returns the process to S130.

In S210, the authenticator assignment unit 11 determines whether the F-system release condition for permitting access to the F-system API is satisfied. When the F-system release condition is satisfied, the process shifts to S220. When the F-system release condition is not satisfied, the process returns to S130.

In S220, the authenticator assignment unit 11 assigns the F-system authenticator to the target application 30 implemented in the external device, and returns the process to S130.

The release conditions used in S150, S170, S190, and S210 may include, for example, a condition that the result of the process executed in response to the API access request from the target application 30 is a predetermined content. The release condition may also include a condition that the authenticator of another classification has been already assigned to the target application 30. In other words, the order in which the authenticator is assigned to each classification may be controlled depending on how the release conditions are set.

The access restriction unit 12 classifies the authenticators assigned to the target applications 30 in S160, S180, S200, and S220 into the O-system, P-system, S-system, and F-system classifications and stores them in the access management DB 13. The access restriction unit 12 invalidates the authenticator in S140 by deleting the authenticator stored in the access management DB 13.

The access restriction unit 12 receives an API access request from a target application 30 (i.e., an external device) and executes an access restriction process to determine whether to permit access to the vehicle API that is the access destination.

Figure 4:
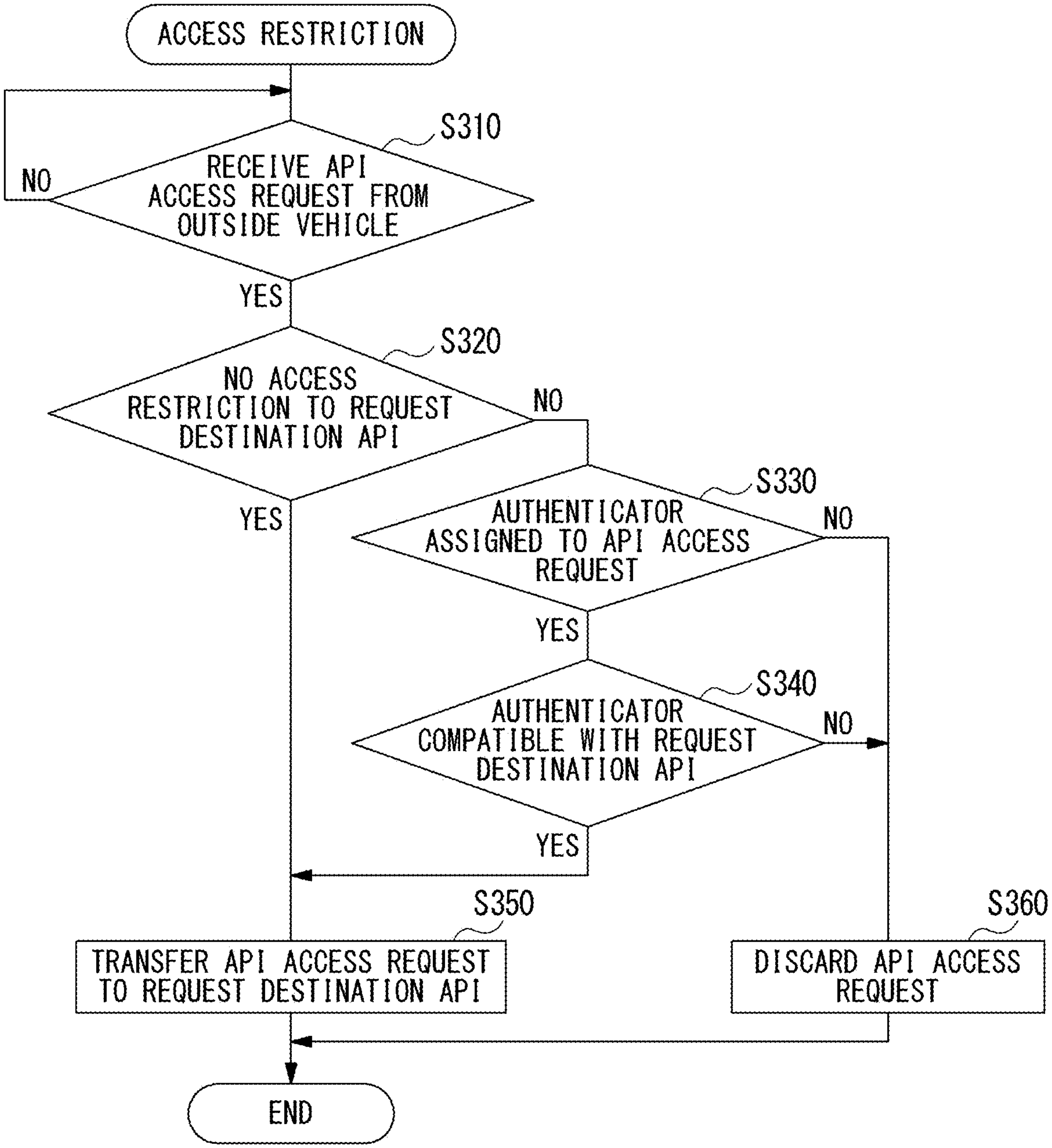
FIG. 4 is a flowchart showing processing contents in an access restriction unit.

Next, the access restriction process executed by the access restriction unit 12 will be described with reference to the flowchart shown in FIG. 4. The access control process is executed commonly for all applications that use the API.

When the access restriction process starts, in S310, the access restriction unit 12 determines whether the API access request has been received from the target application 30 implemented in the external device. When the access restriction unit 12 determines that the API access request has been received, it shifts to S320, and when it determines that the API access request has not been received, it waits by repeating the same process.

In S320, the access restriction unit 12 determines whether the use destination API indicated in the API access request is the N-system API with no access restriction, and when it is the N-system API, the process shifts to S350, and when it is not the N-system API, the process shifts to S330.

In S330, the access restriction unit 12 determines whether the authenticator is assigned to the API access request. When the authenticator is assigned, the process shifts to S340, and when the authenticator is not assigned, the process shifts to S360.

In S340, the access restriction unit 12 determines whether the authenticator assigned to the API access request is compatible with the use destination API, and when it is compatible, the process shifts to S350, and when it is not compatible, the process shifts to S360. Specifically, for example, in a case where the use destination API is the O-system API, when the authenticator assigned to the API access request matches the O-system authenticator stored in the access management DB13, it may be determined to be compatible.

In S350, the access restriction unit 12 determines that the target application 30 has the access privilege to the use destination API, transfers the API access request to the use destination API, and ends the process.

In S360, the access restriction unit 12 determines that the target application 30 does not have the access privilege to the use destination API, discards the API access request, and ends the process. At this time, the target application 30 that is the use source of the API access request may be notified that the API access request has been discarded.

3. Operation Example

3-1. Representative Operation Example

A representative operation example will be described with reference to the sequence diagrams of FIGS. 5 to 7. In addition, in order to make the drawings easier to understand, the API groups 51 to 55 are omitted in FIGS. 5 to 7. This is because the N-system API group 51 and the N-system functional block group 21, the O-system API group 52 and the O-system functional block group 22, the P-system API group 53 and the P-system functional block group 23, the S-system API group 54 and the S-system functional block group 24, and the F-system API group 55 and the F-system functional block group 25 are each in a one-to-one correspondence.

When the vehicle equipped with the in-vehicle system 100 (hereinafter, the subject vehicle) starts up, the in-vehicle system 100 determines by the acceptance determination module 211 whether the subject vehicle is possible to accept the target service. Then, as shown in FIG. 5, the in-vehicle system 100 transmits a result notification M1 indicating the determination result in the acceptance determination module 211 to the target application 30 implemented in the external device.

The target application 30 that has received the result notification M1 indicating that the service is acceptable transmits an API access request M2 to the reliability confirmation module 212. The API access request M2 is accompanied by reliability information, which is information relating to the reliability of the service itself.

The access controller 10 receives the API access request M2 and checks the use destination API indicated in the API access request M2. In this case, since the request is for access to the N-system API (i.e., a positive determination is made in S320), the access controller 10 transfers the API access request M2 to the use destination API. The use destination API operates the destination module, that is, the reliability confirmation module 212, in accordance with the transferred API access request M2.

The reliability confirmation module 212 that receives the API access request M2 notifies the access controller 10 of a reliability notification M3 indicating the result of determining the reliability of the target service based on the reliability information assigned to the API access request M2.

When receiving the reliability notification M3 and determining that the target service is sufficiently reliable, the access controller 10 assumes that the O-system release condition is satisfied (i.e., a positive determination is made in S150), and transmits an access permission notification M4 with the O-system authenticator assigned to the target application 30. For example, when the reliability of the target service in the reliability notification M3 exceeds a predetermined threshold, the access controller 10 may determine that the target service is sufficiently reliable.

Figure 6:
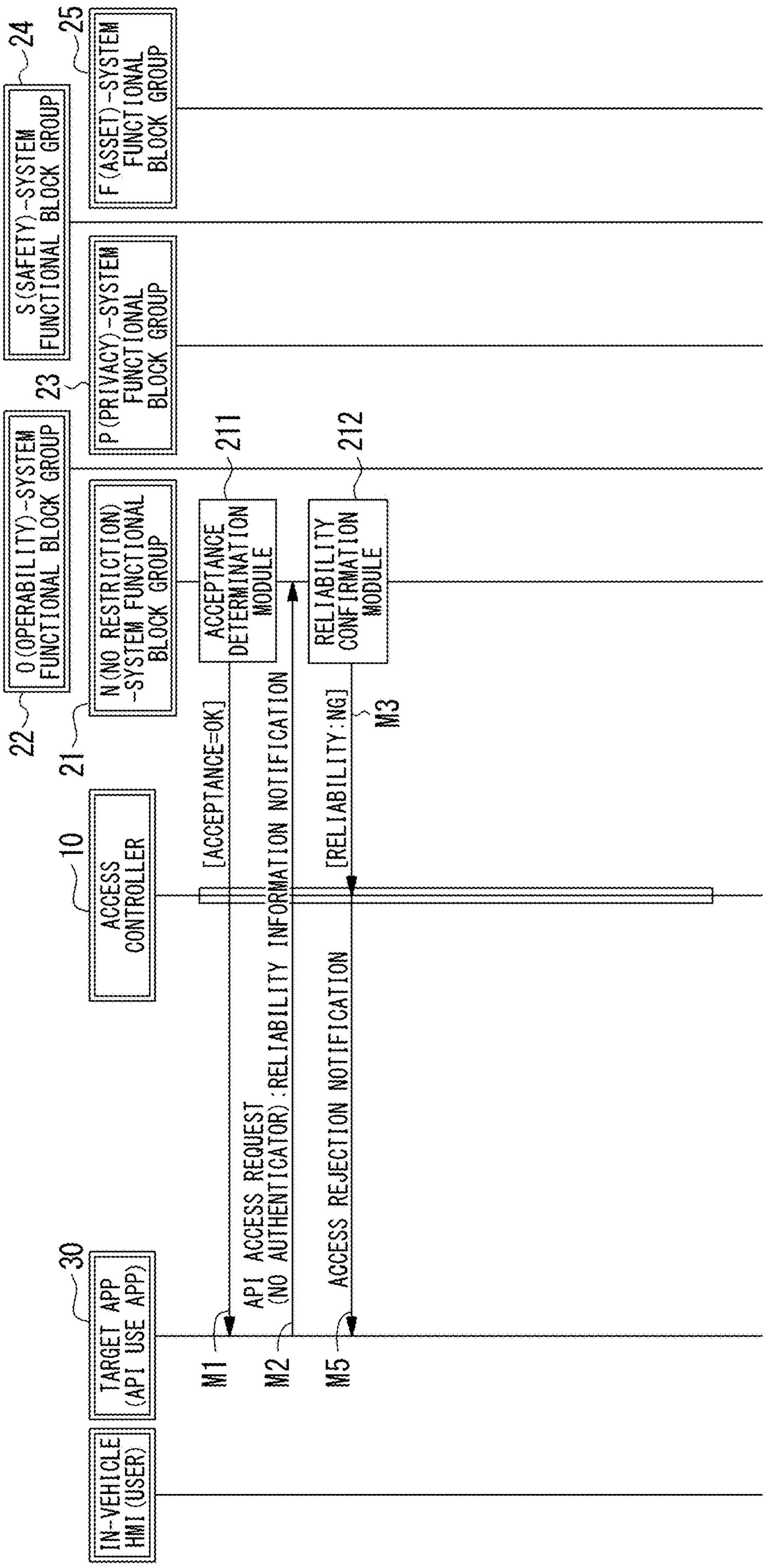
FIG. 6 is a sequence diagram showing a typical operation example of the in-vehicle system.

In addition, when receiving the reliability notification M3 and determining that the target service is not reliable, the access controller 10 transmits an access refusal notification M5 to the target application 30 indicating that access permission to the O-system API is being denied, as shown in FIG. 6.

Returning to FIG. 5, the target application 30 that has received the access permission notification M4 transmits an API access request M6 to the provision confirmation module 221. The API access request M6 is accompanied by the O-system authenticator acquired in the access permission notification M4. The provision confirmation module 221 provides a function for confirming the user intention regarding the provision of the target service via the in-vehicle HMI.

The access controller 10 that has received the API access request M6 checks the use destination API and the like indicated in the API access request M6. Here, the request is an access request to the O-system API (i.e., a negative determination is made in S320), and the authenticator is assigned (i.e., a positive determination is made in S330), and the authenticator is compatible with the use destination API (i.e., a positive determination is made in S340). Therefore, the access controller 10 transfers the API access request M6 to the use destination API. The use destination API operates the provision confirmation module 221, which is a destination module, in accordance with the transferred API access request M6.

The provision confirmation module 221, which has been operated in accordance with the API access request M6, transmits a provision confirmation request M7 to the ECU that controls the in-vehicle HMI.

The ECU that receives the provision confirmation request M7 displays a message via the in-vehicle HMI prompting the user to confirm whether the user requests reception of the target service, and when the user enters input, it returns a user response M8 indicating the input content to the provision confirmation module 221.

The provision confirmation module 221 that has received the user response M8 transmits, to the access controller 10, a provision confirmation notification M9 indicating the user intention indicated in the user response M8.

In a case where the access controller 10 receives the provision confirmation notification M9, when the provision confirmation notification M9 indicates a request to provide the target service, the access controller 10 assumes that the P-system release condition has been satisfied (i.e., a positive determination has been made in S170), and transmits an access permission notification M10 with a P-system authenticator assigned to the target application 30. In addition, when the provision confirmation notification M9 indicates that the provision of the target service is not requested, the access controller 10 transmits an access rejection notification M11 to the target application 30 indicating that the assignment of access to the P-system API is being rejected, as shown in FIG. 7.

Returning to FIG. 5, the target application 30 that has received the access permission notification M10 transmits an API access request M12 to the information provision module 231. The API access request M12 is accompanied by the P-system authenticator acquired in the access permission notification M10.

The access controller 10 that receives the API access request checks the use destination API and the like indicated in the API access request M12. Here, it is an access request to a P-system API (i.e., a negative determination is made in S320), and an authenticator is assigned (i.e., a positive determination is made in S330), and the authenticator is compatible with the use destination API (i.e., a positive determination is made in S340). Therefore, the access controller 10 transfers the API access request M12 to the use destination API. The use destination API operates the information provision module 231, which is a use destination module, in accordance with the transferred API access request M12.

The information provision module 231 operated in accordance with the API access request M12 acquires the privacy information indicated in the API access request M12, and transmits the acquired privacy information to the target application 30 by an information provision notification M13.

The target application 30 that receives the information provision notification M13 transmits an API access request M14 to the start confirmation module 222. The API access request M14 is accompanied by the O-system authenticator acquired in the access permission notification M4. The start confirmation module 222 provides a function for confirming the user intention regarding the start of the target service via the in-vehicle HMI.

The access controller 10, which has received the API access request M14, checks the use destination API and the like indicated in the API access request M14. Here, it is an access request to the O-system API (i.e., a negative determination is made in S320), and the authenticator is assigned (i.e., a positive determination is made in S330), and the authenticator is compatible with the use destination API (i.e., a positive determination is made in S340). Therefore, the access controller 10 transfers the API access request M14 to the use destination API. The use destination API operates the start confirmation module 222, which is a use destination module, in accordance with the transferred API access request M14.

The start confirmation module 222, which has been operated in accordance with the API access request M14, transmits a start confirmation request M15 to the ECU that controls the in-vehicle HMI.

The ECU that receives the start confirmation request M15 displays a message via the in-vehicle HMI prompting the user to confirm whether the user requests starting the target service. When the user enters input, the ECU returns a user response M16 indicating the input content to the start confirmation module 222.

The start confirmation module 222 that receives the user response M16 transmits, to the access controller 10, a start necessity notification M17 indicating the user intention indicated in the user response M16.

In a case where the access controller 10 has received the start necessity notification M17, when the start necessity notification M17 indicates the request to start the target service, the access controller 10 assumes that the S-system release condition is satisfied (i.e., a positive determination is made in S190) and transmits an access permission notification M18 with the S-system authenticator assigned to the target application 30. In addition, when the start necessity notification M17 indicates no request of the start of the target service, the access controller 10 transmits an access rejection notification (not shown) to the target application 30 indicating that access privileges to the S-system API are being rejected.

The target application 30 that has received the access permission notification M18 transmits an API access request M19 to the vehicle control module 241. The API access request M19 is accompanied by the S-system authenticator acquired in the access permission notification M18.

The access controller 10, which has received the API access request M19, checks the use destination API and the like indicated in the API access request M19. Here, it is an access request to the S-system API (i.e., a negative determination is made in S320), the authenticator is assigned (i.e., a positive determination is made in S330), and the authenticator is compatible with the use destination API (i.e., a positive determination is made in S340). Therefore, the access controller 10 transfers the API access request M19 to the use destination API. The use destination API operates the use destination module, that is, the vehicle control module 241, in accordance with the transferred API access request M19.

The vehicle control module 241 operated in accordance with the API access request M19 executes vehicle control necessary to implement the target service, in accordance with the instructions indicated in the API access request M19. Although FIG. 5 shows only one API access request M19 to the vehicle control module 241, multiple API access requests M19 may be transmitted.

Thereafter, when it is necessary to end the service, the target application transmits an API access request M20 to the end determination module 213.

The access controller 10, which has received the API access request M20, checks the use destination API and the like indicated in the API access request M20. In this case, since the request is for access to the N-system API (i.e., a positive determination is made in S320), the access controller 10 transfers the API access request M20 to the use destination API. The use destination API operates the end determination module 213, which is a use destination module, in accordance with the transferred API access request M20.

The end determination module 213, which has been operated in response to the API access request M20, transmits an end notification M21 to the access controller 10 when the state of the subject vehicle satisfies a preset end condition. The end condition is not limited to receiving the API access request M20, and may include detection of a vehicle abnormality, and the like.

Upon receiving the end notification M21, the access controller 10 determines that the F-system release condition is satisfied (i.e., a positive determination is made in S210), and transmits an access permission notification M22 with the F-system authenticator assigned to the target application 30.

The target application 30 that has received the access permission notification M22 transmits an API access request M23 to the settlement module 251. The API access request M23 is accompanied by the F-system authenticator acquired in the access permission notification M22.

The access controller 10, which has received the API access request M23, checks the use destination API and the like indicated in the API access request M23. Here, it is the access request to the F-system API (i.e., a negative determination is made in S320), and the authenticator is assigned (i.e., a positive determination is made in S330), and the authenticator is compatible with the use destination API (i.e., a positive determination is made in S340). Therefore, the access controller 10 transfers the API access request M23 to the use destination API. The use destination API operates the settlement module 251 that is the use destination module, in accordance with the transferred API access request M23.

The settlement module 251, which operates in accordance with the API access request M23, executes a process for settling the cost required for the target service, and then transmits a payment completion notification M24 to the access controller 10.

When the access controller 10 receives the payment completion notification M24, it assumes that the service has ended (i.e., a positive determination is made in S130), invalidates each authenticator assigned to the target application 30 during the processing, and transmits a service end notification M25 to the target application.

Upon receiving the service end notification M25, the target application 30 discards each authenticator given by the access controller 10 as a processing assumption, and ends the provision of the service.

In addition, when the fee is not settled, upon receiving the end notification M21, the access controller 10 may assume that the service has ended (i.e., a positive determination has been made in S130), and may invalidate the authenticator and transmit the service end notification M25 to the target application 30.

3-2. Operational Example of Platooning Service

Next, an example of the operation when the API use application provides the platooning service will be described.

Figure 8:
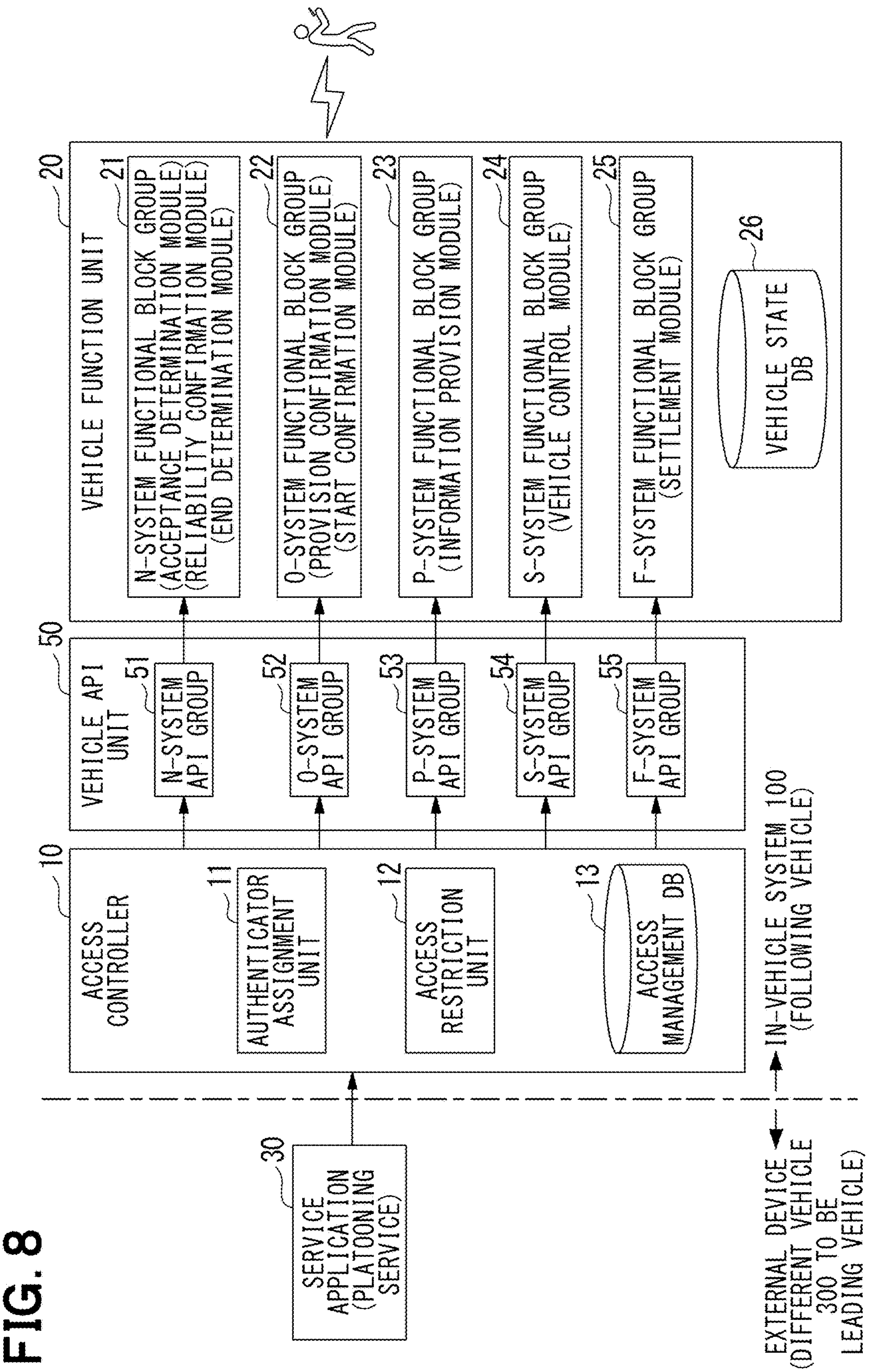
FIG. 8 is a block diagram showing a functional configuration when an API use service is a platooning service.

In this case, as shown in FIG. 8, the different vehicle 300 which is the front vehicle of the platooning serves as an external device which provides a service (hereinafter, referred to as a service provision vehicle). The service provision vehicle 300 includes a service application (hereinafter, referred to as a target application) 30 for providing the platooning service.

Figure 7:
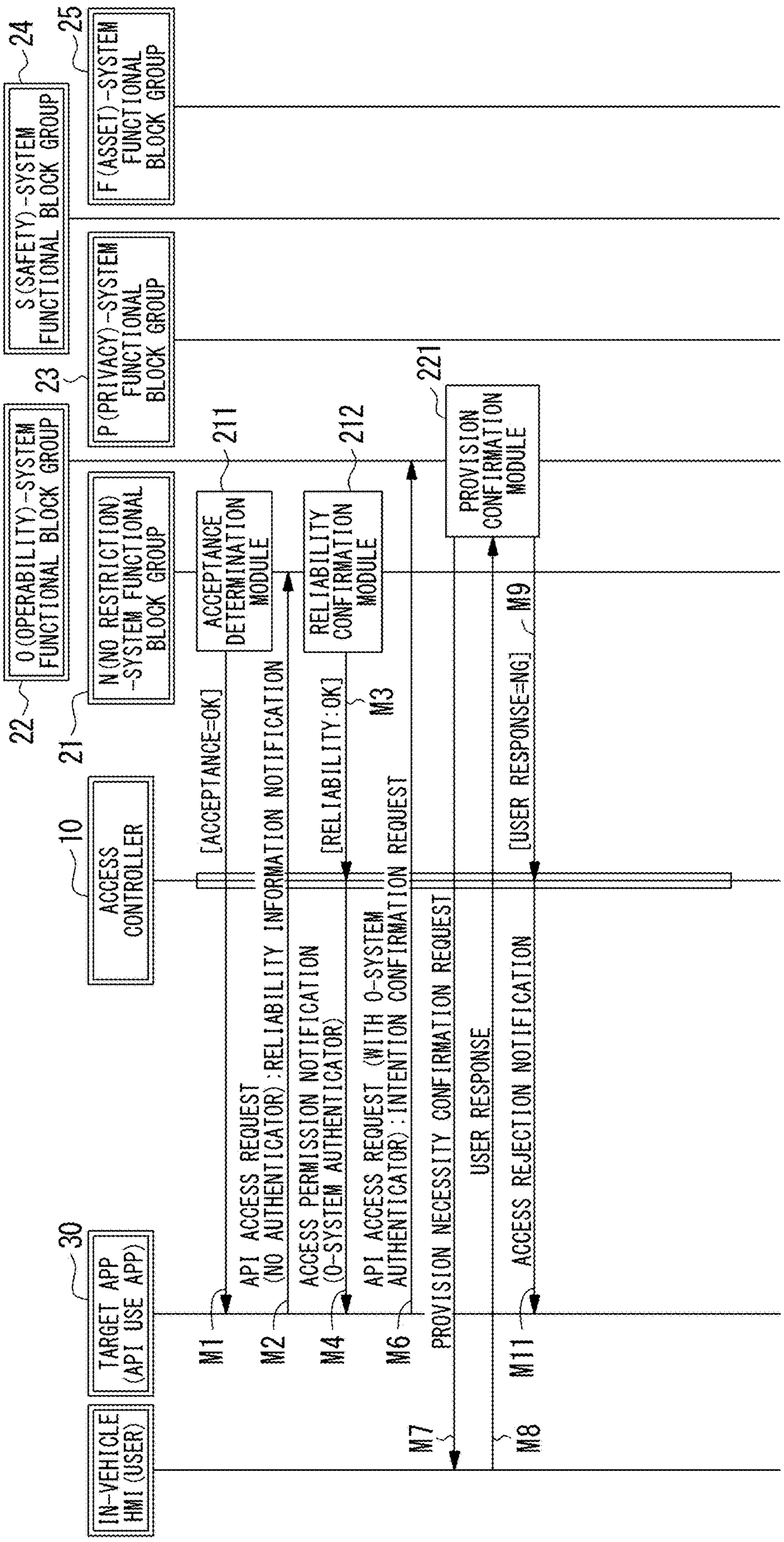
FIG. 7 is a sequence diagram showing a typical operation example of the in-vehicle system.

The procedure for the platooning service follows the general procedures shown in FIGS. 5 to 7.

However, the acceptance determination module 211 used in the platooning service may include, in the determination conditions, for example, a condition that the subject vehicle is traveling on a road on which the provision of the platooning service is permitted. The roads on which the provision of platooning services is permitted may be, for example, specific roads on which there are no pedestrians, such as expressways.

The reliability confirmation module 212 used in the platooning service acquires the position and speed of the service provision vehicle as the reliability information, and calculates a reliability that is higher as the service provision vehicle is closer to the host vehicle or as the relative speed with respect to the subject vehicle is slower. Then, the reliability equal to or greater than a threshold value may be used as a condition for determining whether a service provision vehicle is sufficiently reliable. In addition, the determination condition may be that at least one of the distance and the relative speed with respect to the service provision vehicle is within an allowable range.

The information provision module 231 used in the platooning service may provide route information to the destination as privacy information to the target application 30. The route information may be set, for example, using a navigation device mounted on the subject vehicle.

The end determination module 213 used in the platooning service may determine that the end condition is satisfied when the destination is reached, when the service provision vehicle is instructed to leave the platoon, when the user inputs a request to leave the platoon via the in-vehicle HMI, and the like.

In other words, in the platooning service, when the subject vehicle is possible to accept the service and the service provision vehicle is sufficiently reliable, the in-vehicle system 100 of the subject vehicle assigns the O-system authenticator to the target application 30. The target application 30 uses the assigned O-system authenticator to access the provision confirmation module 221 belonging to the O-system functional block group 22, thereby confirming with the user whether the user intends to receive the provision of the service. When the user intention is confirmed, the in-vehicle system 100 assigns the P-system authenticator to the target application 30. The target application 30 uses the assigned P-system authenticator to access the information provision module 231 belonging to the P-system functional block group 23, thereby acquiring the route information which is private information. Furthermore, the target application 30 uses the previously assigned O-system authenticator to access the start confirmation module 222 belonging to the O-system functional block group 22, and again confirms with the user whether to start providing the service. When the user intention to start provision is confirmed, the in-vehicle system 100 assigns the S-system authenticator to the target application 30. The target application 30 uses the assigned S-system authenticator to access the vehicle control module 241 belonging to the S-system functional block group 24, thereby executing vehicle control for implementing the platooning. When the in-vehicle system 100 confirms that the end condition of the target application 30 is satisfied, it assigns the F-system authenticator to the target application 30. The target application 30 uses the assigned F-system authenticator to access the settlement module 251 belonging to the F-system functional block group 25 to perform settlement for the service provided by the target application 30. When the settlement is completed, the in-vehicle system 100 invalidates each authenticator that was assigned to the target application 30.

3-3. Example of Operation in AVP Service

Next, an example of the operation when the API use application provides the AVP service will be described.

Figure 9:
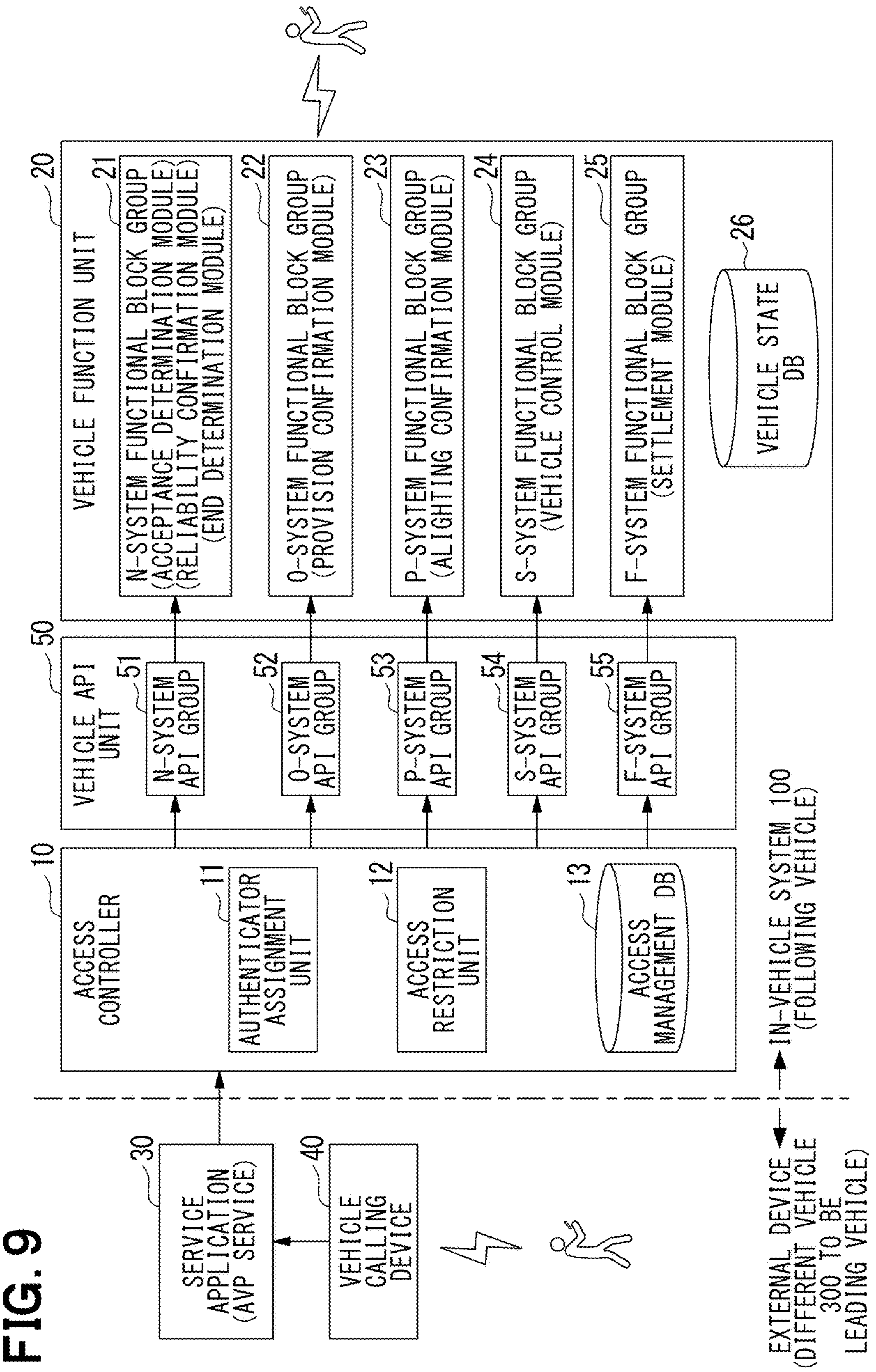
FIG. 9 is a block diagram showing a functional configuration when the API use service is an AVP service.

In this case, as shown in FIG. 9, the AVP infrastructure 200 installed in a parking lot serves as an external device that provides a service. The AVP infrastructure 200 includes a service application (hereinafter, a target application) 30 that is executed to implement the AVP service. The AVP infrastructure 200 also includes a vehicle calling device 40 for calling a parked vehicle.

Instead of using the vehicle calling device 40, the user terminal 400 may be configured to call a vehicle.

The AVP service procedures are the same as the general procedures shown in FIGS. 5 to 7, including service acceptance determination, service reliability confirmation, confirmation of the need for service provision to the user, and service end/settlement, that is, the procedures using messages M1 to M10 and M20 to M25.

However, the acceptance determination module 211 used in the AVP service may determine that the vehicle is acceptable when the subject vehicle position is in the vicinity of a parking lot where the AVP service is provided, for example.

The reliability confirmation module 212 used in the AVP service acquires, as reliability information, the location and name of the parking lot providing the AVP service from the target application 30. When there is a match with the pre-stored parking lot location and parking lot name, it may be determined that the AVP infrastructure 200 is reliable.

In the AVP service, as shown in FIG. 10, the target application 30 that receives the access permission notification M10 transmits an API access request M31 to the alighting confirmation module 232 that belongs to the P-system functional block group 23. The API access request M31 is accompanied by the P-system authenticator acquired in the access permission notification M10. The alighting confirmation module 232 acquires images of the inside of the vehicle, and based on the results of image analysis, and the like, confirms whether all occupants have alighted, and transmits the confirmation result to the access controller 10. Since the process in the alighting confirmation module 232 includes access to privacy information (i.e., images taken inside the vehicle), the API access request M31 to the alighting confirmation module needs the assignment of the P-system authenticator.

The access controller 10, which has received the API access request M31, checks the use destination API and the like indicated in the API access request M31. Here, it is an access request to a P-system API (i.e., a negative determination is made in S320), and an authenticator is assigned (i.e., a positive determination is made in S330), and the authenticator is compatible with the use destination API (i.e., a positive determination is made in S340). Therefore, the access controller 10 transfers the API access request M31 to the use destination API. The use destination API operates the alighting confirmation module 232 that is the destination module, in accordance with the API access request M31.

The alighting confirmation module 232 operated in response to the API access request M31 transmits, to the access controller 10, an alighting confirmation notification M32 indicating whether all occupants have alighted.

In a case where the access controller 10 receives the alighting confirmation notification M32, when the alighting confirmation notification M32 indicates that all occupants have alighted, the access controller 10 assumes that the S-system release condition has been satisfied (i.e., a positive determination has been made in S190), and transmits an access permission notification M33 with the S-system authenticator assigned to the target application 30. In addition, when the alighting confirmation notification M32 indicates that there are occupants who have not yet alighted, the access controller 10 transmits an access rejection notification (not shown) to the target application 30 indicating that access permission to the S-system API is being rejected.

The target application 30 that receives the access permission notification M33 transmits an API access request M34 to the vehicle control module 241. The API access request M34 is accompanied by the S-system authenticator acquired in the access permission notification M33.

The access controller 10, which has received the API access request M34, checks the use destination API, and the like, and transfers the API access request M34 to the use destination API. The use destination API operates the vehicle control module 241 in accordance with the API access request M34.

The vehicle control module 241 operated in accordance with the API access request M34 executes vehicle control in accordance with the instructions contained in the API access request M34. The target application 30 repeatedly transmits the API access request M34 until the subject vehicle reaches the parking space. As a result, the entering by the automated driving is implemented.

Thereafter, the target application 30 that has received the call instruction via the vehicle calling device 40 transmits an API access request M35 to the vehicle control module 241. The API access request M35 is accompanied by the S-system authenticator acquired in the access permission notification M33.

The access controller 10, which has received the API access request M35, checks the use destination API, and the like, and transfers the API access request M35 to the use destination API. The use destination API operates the utilization module, the vehicle control module 241, in accordance with the API access request M35.

The vehicle control module 241 operated in accordance with the API access request M35 executes vehicle control in accordance with the instructions contained in the API access request M35. The target application 30 repeatedly transmits the API access request M34 until the subject vehicle leaves the parking space and reaches the designated boarding/alighting space. As a result, the leaving by the automated driving is implemented.

When the vehicle has been completely left from the garage, the target application 30 transmits the API access request M20 to the end determination module 213. The subsequent procedures are similar to the general procedures shown in FIG. 5.

In other words, in the AVP service, when the subject vehicle is located near a parking lot and information obtained from the parking lot's AVP infrastructure indicates that the parking lot is the parking lot where the vehicle is planned to park, the in-vehicle system 100 of the subject vehicle assigns the O-type authenticator to the target application 30. The target application 30 uses the assigned O-system authenticator to access the provision confirmation module 221 belonging to the O-system functional block group 22, thereby confirming with the user whether the user intends to receive the provision of the service. When the user intention is confirmed, the in-vehicle system 100 assigns the P-system authenticator to the target application 30. The target application 30 uses the assigned P-system authenticator to access the alighting confirmation module 232 belonging to the P-system functional block group 23, and confirms that all occupants have alighted based on images of the interior of the vehicle. When it is confirmed that all occupants have exited the vehicle, the in-vehicle system 100 assigns the S-system authenticator to the target application 30. The target application 30 uses the assigned S-system authenticator to repeatedly access the vehicle control module 241 belonging to the S-system functional block group 24. Thereby, it is possible to execute vehicle control for implementing the entering.

When the vehicle call instruction is input via the vehicle calling device 40, the target application 30 uses the previously assigned S-system authenticator to repeatedly access the vehicle control module 241 belonging to the S-system functional block group 24. Thereby, it is possible to perform vehicle control to implement the leaving by the specified vehicle. When the condition for ending the service is satisfied by completing the leaving, the in-vehicle system 100 assigns the F-system authenticator to the target application 30. The target application 30 uses the assigned F-system authenticator to access the settlement module 251 belonging to the F-system functional block group 25 to perform settlement for the AVP service provided by the target application 30. When the settlement is completed, the in-vehicle system 100 invalidates each authenticator that was assigned to the target application 30.

4. Correspondence of Terms

In the present embodiment, the in-vehicle system 100 corresponds to the access control device in the present disclosure, and the acceptance determination module 211 and the reliability confirmation module 212 correspond to the acceptance determination unit in the present disclosure. The start confirmation module 222 corresponds to a start confirmation unit in the present disclosure, and the settlement module 251 corresponds to a settlement unit in the present disclosure. The authenticator assignment unit 11 corresponds to a first provision unit to third provision unit in the present disclosure. In particular, the processes of S150 to S160 correspond to a first assignment unit in the present disclosure, the processes of S170 to S200 correspond to a second assignment unit in the present disclosure, and the processes of S210 to S220 correspond to a third assignment unit in the present disclosure.

5. Effects

According to the above-described embodiment, the following effects are achieved.

(a) In the case of receiving the provision of the API use service, the reliability of the service provider is confirmed. When the service provider is reliable, access to vehicle APIs used for obtaining information necessary for providing the service and for controlling the vehicle is gradually assigned. Therefore, it is possible to appropriately restrict the unnecessary access to the vehicle API from outside the vehicle, and safely use the API use services.

(b) Since the user consent is included when assigning access privileges, even when the conditions for receiving the service are satisfied, it is possible to prevent vehicle information from being leaked or vehicle control from being performed against the user intentions.

(c) When the API use service is a platooning service, the different vehicle 300 becomes the service provider, and the service is implemented through vehicle-to-vehicle communication without going through the center device. Accordingly, since no time lag occurs due to communication via the center device, it is possible to provide appropriate services according to the situation in the periphery of the subject vehicle.

That is, in the conventional vehicle platooning system, services are provided via a center device, and a time lag occurs depending on the processing status at the center device and the communication status between the center device and the in-vehicle system 100. Such a time lag is fatal for the traveling vehicle in the peripheral situation that is changing in real time. In the present embodiment, it is possible to prevent such a time lag from causing the user to be unable to receive the necessary service at the moment when it is needed, for example, prevent missing an opportunity to join or leave the platoon.

(d) In the case where the API use service is the AVP service, when the AVP infrastructure is assigned access to the vehicle API that provides vehicle control when it is confirmed that all occupants have alighted from the vehicle by accessing image information that is obtained by capturing the inside of the vehicle and is private information. Accordingly, it is possible to prevent the vehicle from moving into the parking space while leaving some of the occupants trapped inside the vehicle.

6. Other Embodiments

Although the embodiment of the present disclosure has been described above, the present disclosure is not limited to the embodiment described above, and various modifications can be made to implement the present disclosure.

(a) In the above embodiment, the vehicle API is classified by FSOP and access privileges are assigned for each classification together. However, for example, the stage at which access privileges are assigned may be different for each type of vehicle control within the S classification.

(b) In the above embodiment, when starting a service, the procedure for starting the service is started without authenticating the service provider, and when a user accesses the service via the HMI device, the user input is accepted without performing personal authentication. To improve the security, authentication of the service provider and personal authentication may be performed.

(c) The in-vehicle devices 2 to 5 and the methods according to the present disclosure may be achieved by a dedicated computer provided by constituting a processor and a memory programmed to execute one or more functions embodied by a computer program. Alternatively, the in-vehicle devices 2 to 5 and the methods according to the present disclosure may be achieved by a dedicated computer provided by constituting a processor with one or more dedicated hardware logic circuits. Alternatively, the in-vehicle devices 2 to 5 and the like and the methods described in the present disclosure may be achieved by one or more dedicated computers configured by combinations of processors and memories programmed to perform one or more functions and processors configured by one or more hardware logic circuits. The computer program may be stored in a computer-readable non-transitory tangible storage medium as instructions to be executed by a computer. The technology for implementing the functions of each unit included in the in-vehicle devices 2 to 5 and the like does not necessarily need to include software, and all the functions may be implemented using one or a plurality of hardware circuits.

(d) The multiple functions of one component in the above embodiment may be implemented by multiple components, or a function of one component may be implemented by multiple components. In addition, multiple functions of multiple components may be implemented by one component, or a single function implemented by multiple components may be implemented by one component. Part of the configuration of the above embodiment may be omitted. Further, at least part of the configuration of the above-described embodiments may be added to or replaced with the configuration of another embodiment described above.

(e) In addition to the access control device described above, the present disclosure can be implemented in various forms, such as a system that includes the access control device as a component, a program for causing a computer to function as the access control device, a non-transitory tangible storage medium such as a semiconductor memory on which the program is stored, and an access control method.

The invention claimed is:

1. An access control device comprising:

an access controller configured to receive an access request from an application programming interface (API) use application outside a vehicle, control access to a vehicle API, the API use application being an application that implements a service using a vehicle API that is an interface for providing a vehicle function of the vehicle; and an acceptance determination unit configured to provide, via the vehicle API, a function of determining whether the vehicle is possible to accept a target service that is the service by the API use application; and a start confirmation unit configured to provide, via the vehicle API, a function of confirming with a user of the vehicle whether to start provision of the target service, wherein the access controller includes:

a first assignment unit configured to assign, to the API use application, an access privilege to the vehicle API that provides a function of the start confirmation unit, when the acceptance determination unit determines that the vehicle is possible to accept the target service; and a second assignment unit configured to assign, when the start confirmation unit confirms a start intention of the user, an access privilege to the vehicle API necessary for providing the target service to the API use application.

2. The access control device according to claim 1, comprising an external device that is present within a range where peer-to-peer communication with the vehicle is possible.

3. The access control device according to claim 1, further comprising a settlement unit configured to provide a function of performing settlement related to the target service via the vehicle API, wherein the access controller further includes a third assignment unit configured to assign, to the API use application, an access privilege to the vehicle API that provides the function of the settlement unit when an end of the target service is confirmed.

4. The access control device according to claim 1, wherein the target service is a platooning service that controls a following vehicle to cause the following vehicle to travel while maintaining platoon in accordance with an instruction from a leading vehicle, and the API use application is provided in a different vehicle at a head of the platoon.

5. The access control device according to claim 4, wherein the acceptance determination unit determines whether the vehicle is traveling on a road on which the platooning service is permitted.

6. The access control device according to claim 4, wherein the acceptance determination unit determines whether at least one of a distance from the different vehicle or a relative speed is within an allowable range.

7. The access control device according to claim 4, wherein the vehicle API necessary for providing the platooning service includes a privacy system API that provides a function of acquiring route information to a destination of the vehicle, and a safety system API that provides a function of controlling a behavior of the vehicle.

8. The access control device according to claim 1, wherein the target service is an auto valet parking service in which entering and leaving a parking lot is performed by automated driving, and the API use application is provided in an infrastructure device installed in a parking lot that implements the auto valet parking service.

9. The access control device according to claim 8, wherein the acceptance determination unit determines whether a subject vehicle position and a pre-set parking lot name match information provided by a service provider.

10. The access control device according to claim 8, wherein the vehicle API necessary for providing the auto valet parking service includes a privacy-system API that provides a function of acquiring information necessary for confirming that an occupant of the vehicle has alighted, and a safety system API that provides a function of controlling a behavior of the vehicle.

11. An access control method comprising:

receiving an access request from an API use application provided outside a vehicle;

controlling access to a vehicle API, the API use application being an application that implements a service using a vehicle API that is an interface for providing a vehicle function of the vehicle;

when an acceptance determination unit configured to provide, via the vehicle API, a function for determining whether the vehicle is possible to accept a target service that is a service provided by the API use application determines that the target service is possible to be accepted, assigning, to the API use application, an access privilege to the vehicle API that provides a function of a start confirmation unit; and when the start confirmation unit confirms a start intention of a user of the vehicle, assigning an access privilege to the vehicle API necessary for providing the target service to the API use application, the start confirmation unit being configured to provide a function of confirming with a user of the vehicle whether to start provision of the target service.

12. An access control device comprising:

a processor; and a memory coupled to the processor and storing program instructions that when executed by the processor cause the processor to at least:

receive an access request from an application programming interface (API) use application outside a vehicle, control access to a vehicle API, the API use application being an application that implements a service using a vehicle API that is an interface for providing a vehicle function of the vehicle; and provide, via the vehicle API, a function of determining whether the vehicle is possible to accept a target service that is the service by the API use application; and serve as a start confirmation unit configured to provide, via the vehicle API, a function of confirming with a user of the vehicle whether to start provision of the target service, assign, to the API use application, an access privilege to the vehicle API that provides a function of the start confirmation unit, when determining that the vehicle is possible to accept the target service; and assign, when the start confirmation unit confirms a start intention of the user, an access privilege to the vehicle API necessary for providing the target service to the API use application.

* * * * *